United States Patent [19]

Sakai et al.

[11] Patent Number: 4,587,838
[45] Date of Patent: May 13, 1986

[54] AUTOMATIC EXAMINATION SYSTEM FOR MOTOR VEHICLES

[75] Inventors: Kenji Sakai; Takeshi Wakabayashi, both of Nagoya; Kakumasa Fukuzawa, Tokyo; Teruzo Hiraoka, Hachioji, all of Japan

[73] Assignees: Mitsubishi Jukogyo Kabushiki Kaisha; Chuo Denshi Kabushiki Kaisha, both of Tokyo, Japan

[21] Appl. No.: 610,816

[22] Filed: May 15, 1984

[51] Int. Cl.$^4$ ........................................... G01M 15/00
[52] U.S. Cl. ...................................................... 73/116
[58] Field of Search ............... 73/116, 117.3; 324/160, 324/402

[56] References Cited

U.S. PATENT DOCUMENTS

| | | | |
|---|---|---|---|
| 3,977,239 | 8/1976 | Hulls et al. | 73/115 |
| 4,179,922 | 12/1979 | Bouverie et al. | 73/116 |
| 4,337,647 | 7/1982 | Radcliffe et al. | 73/116 |

FOREIGN PATENT DOCUMENTS 155858 12/1981 Japan ....................... 324/160

Primary Examiner—Jerry W. Myracle
Attorney, Agent, or Firm—Wenderoth, Lind & Ponack

[57] ABSTRACT

An automatic examination system for motor vehicles can quickly and automatically examine whether an engine of an automobile or the like is good or bad without making contact with the body of the automobile or the like includes a receiver section disposed apart from the engine of the automobile or the like for receiving via a space either electrical signals or sonic signals transmitted from the engine, a period measurement section for measuring the respective periods between the respective signals received by the receiver section, a period difference calculator section for calculating the respective period differences between the respective periods measured by the period measurement section, and a good/bad decision section for deciding whether the engine is good or bad by comparing the respective period differences calculated by the period difference calculator section with a given reference value.

3 Claims, 6 Drawing Figures

AUTOMATIC EXAMINATION SYSTEM FOR MOTOR VEHICLES

BACKGROUND OF THE INVENTION

The present invention relates to an automatic examination system for motor vehicles which can quickly and automatically examine whether an engine of an automobile or the like is good or bad without making contact with the body of the automobile or the like.

Heretofore, in the known examination system for an engine of an automobile, various sensors were mounted at the respective portions of the engine to pick up electrical, magnetic, optical, pneumatic or other variations in the form of signals; meters or indicators were actuated by processing the signals, and the states of the respective portions were thereby measured and examined. Accordingly, such known systems were inadequate for momentary measurement and momentary examination because it was necessary to stop an automobile to be examined and to mount senors thereon.

More particularly, it was impossible to measure and examine a state of an engine of an automobile stopping by a gas station or the like for the purpose of receiving fuel, during the short time needed for receiving fuel while a hood is kept closed without previously mounting sensors to the automobile.

The present inventors have conducted research over many years in order to overcome the above-mentioned shortcoming in the prior art, and as a result, when they examined many (about 500) automobiles which were being used by means of a general examination system and statistically analyzed the results of their examination, especially marking the items relating to "uneven rotation" among the various items examined during idling of an engine, they discovered the fact that in the case where uneven rotation exceeding, for example, 50 rpm was produced, the engine was being influenced by other faulty functions such as faulty contact points, a faulty ignition voltage, an insufficient accerelation and output, a faulty battery, faulty tuning of a carburetor, etc. Hence, the present invention was conceived in view of the determination that the condition of an engine can be known simply by merely detecting uneven rotation of the engine on the basis of the above-mentioned knowledge, and that uneven rotation of an engine can be measure regardless of its type, number of cycles, number of cylinders, etc. by measuring the respective period differences of electrical signals such as an ignition noise or sonic signals generated from the engine, that is, through an angular-velocity-like detection method.

SUMMARY OF THE INVENTION

It is therefore one object of the present invention to provide an automatic examination system for motor vehicles, which can automatically examine an engine quickly and reliably in a remote non-contact manner, and which makes it possible to measure and examine the engine while a driver stays in the driver's seat without necessitating the opening of the hood or the like of the automobile or the like, and which can demonstrate its full capability in quick inspection and examination of an engine in a wide scope of technical fields such as a gas station, a toll gate (a highway entrance), a production line of an automobile manufacturer, etc. without deteriorating a fine view.

According to one feature of the present invention, there is provided an automatic examination system for motor vehicles which comprises a receiver section disposed apart from an engine of an automobile or the like for receiving via space either electrical signals or sonic signals transmitted from the engine, a period measurement section for measuring the respective periods between the respective signals received by the receiver section, a period difference calculator section for calculating the respective period differences between the respective periods measured by the period measurement section, and a good/bad decision section for deciding whether the engine is good or bad by comparing the respective period differences calculated by the period difference calculator section with a given reference value.

BRIEF DESCRIPTION OF THE DRAWINGS

The above-mentioned and other features and objects of the present invention will become more apparent by reference to the following description of preferred embodiments of the invention taken in conjunction with the accompanying drawings, wherein.

DESCRIPTION OF THE PREFERRED EMBODIMENTS

Figure 1:
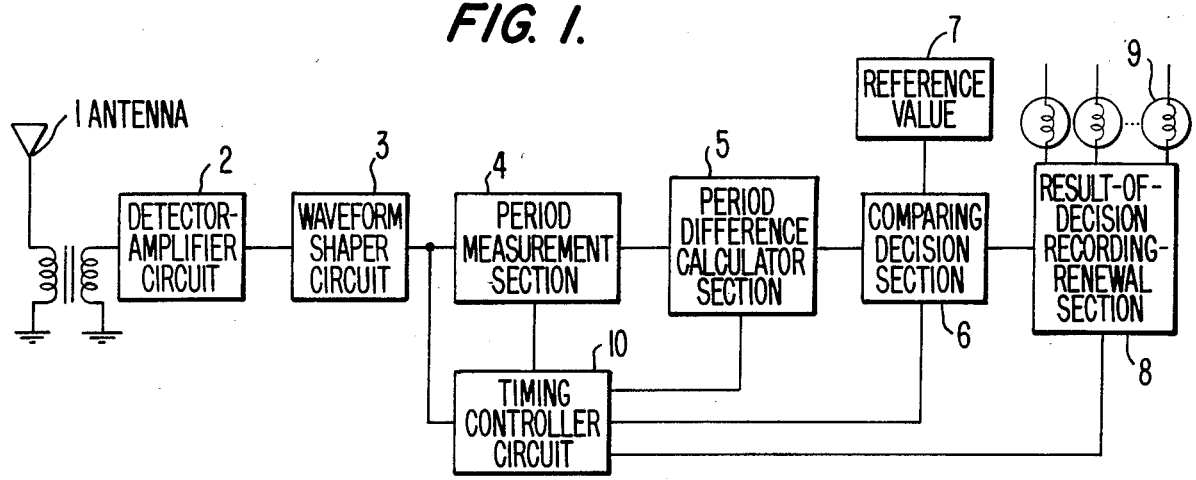
FIG. 1 is a block diagram showing a construction of one preferred embodiment of the present invention.

Now, the present invention will be described in greater detail in connection to its preferred embodiments with reference to the accompanying drawings. A construction of one preferred embodiment of the invention is illustrated in FIG. 1. Reference numeral 1 in FIG. 1 designates a receiver section for receiving signals generated from an automobile engine (not shown) or the like such as, for example, electrical noise (electromagnetic wave) as represented by ignition noise, and normally an antenna corresponds to this receiver section 1. The receiver section 1 is equipped at a location where signal reception can be achieved relatively easily, and especially, at a gas station or the like preferably it is equipped on a floor surface where an automobile passes.

The signals received by the receiver section 1 are sent to a detector-amplifier circuit 2 to be detected and amplified. The signals amplified by the detector-amplifier circuit 2, that is, the waveforms, are sent to a waveform shaper circuit 3, and in this waveform shaper circuit 3 the waveforms are shaped into waveforms which can be easily processed. The shaped waveforms are sent to a period measurement section 4, and the intervals between the individual pulses are measured in the aforementioned period measurement section 4. The period differences between the measured intervals between the individual pulses, that is, between the respective periods are calculated by a period difference calculator section 5. The above-referred respective period differences calculated by the period difference calculator section 5 are compared with a given reference value 7 in a comparating decision section 6, and decision is made whether or not the respective period differences are tolerable differences. The signals produced as a result of decision in the comparating decision section 6 are sent to a result-of-decision recording-renewal indicator section 8, and a good or bad condition of the engine is indicated by lamps 9. The operations of the above-described respective sections are effected on the basis of instructions given by a timing controller circuit 10.

Figure 2:
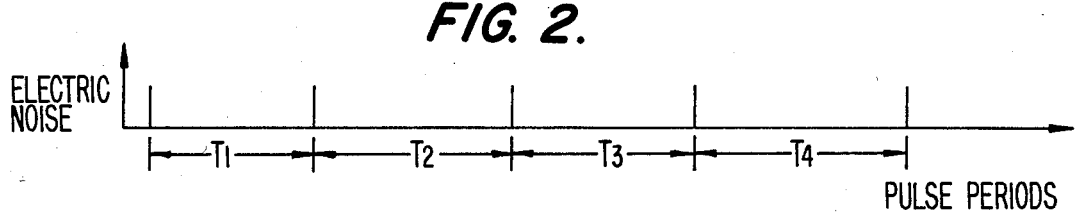
FIG. 2 is a diagram to be used for explaining a basic principle of the present invention.

FIG. 2 is a diagram to be used for explaining a basic principle of the present invention, in which reference symbols $T_1-T_4$, respectively, represent pulse periods in electrical noise generated from an engine. For instance, representing the tolerable difference by $T_s$ and the absolute values of the respective pulse period differences by $|T_1-T_2|$, $|T_2-T_3|$, ..., $|T_i-T_{i+1}|$, respectively, a decision of "good" is made in the case of $|T_1-T_2|$, $|T_2-T_3|$, ..., $|T_i-T_{i+1}| \leq T_s$, while a decision of "bad" is made in the case of $|T_1-T_2|$, $|T_2-T_3|$, ..., $|T_i-T_{i+1}| > T_s$.

Figure 3:
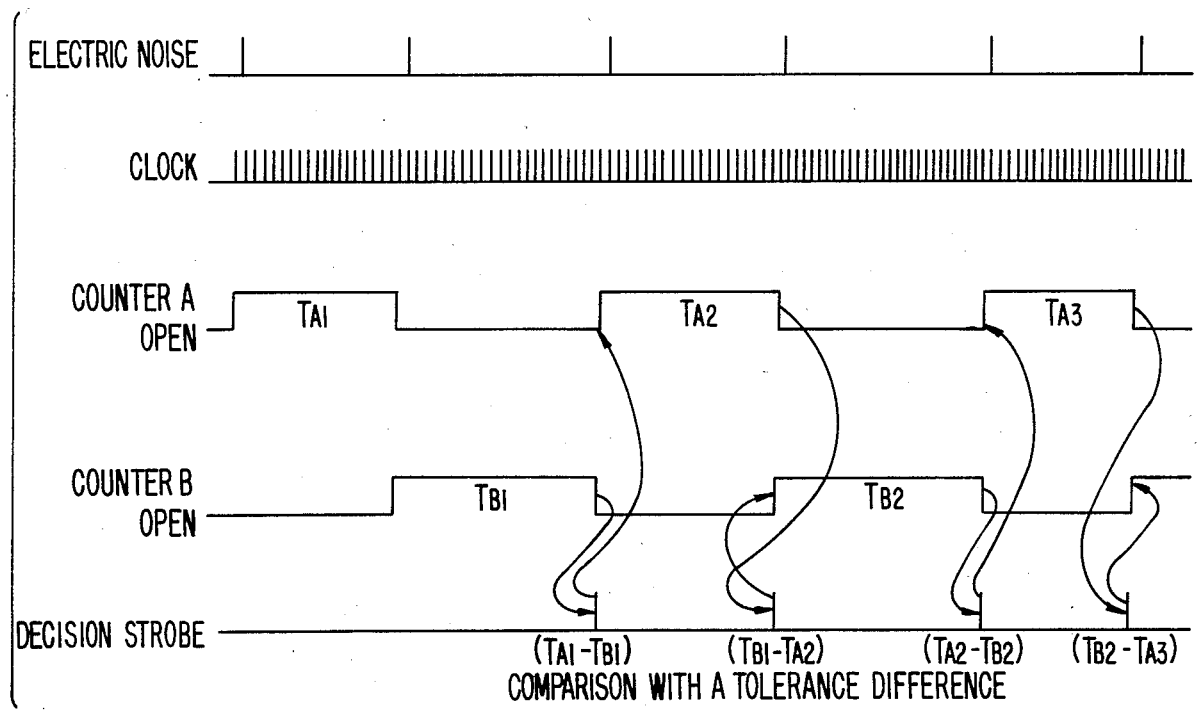
FIG. 3 is a diagram showing an outline of processing according to the basic principle shown in FIG. 2.

FIG. 3 is a diagram showing an outline of a processing according to the basic principle shown in FIG. 2, and with regard to the method of processing, the following two kinds of methods are employed:

(1) Consecutive Comparison Method

This is the method in which the comparison for the respective period differences is effected consecutively by checking the period differences of $(T_{A1}-T_{B1})$, $(T_{B1}-T_{A2})$, $(T_{A2}-T_{B2})$, $(T_{B2}-T_{A3})$, ...

(2) 2-Period Paired Comparison Method:

This is the method in which the comparison for the respective period differences is effected with respect to paired two periods by checking the period differences of $(T_{A1}-T_{B1})$, $(T_{A2}-T_{B2})$, $(T_{A3}-T_{B3})$, ...

Figure 4A:
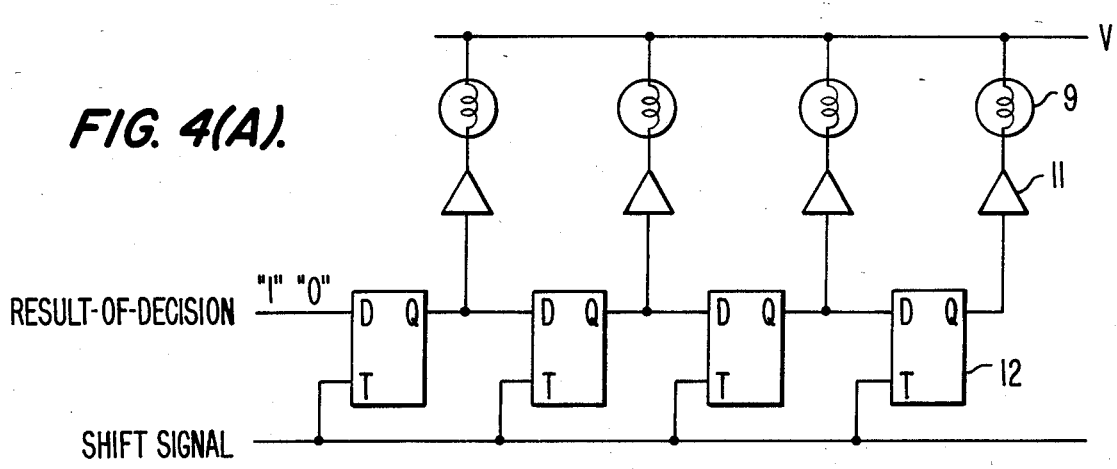
FIG. 4(A) is a schematic circuit diagram showing one example of a result-of-decision recording-renewal indicator section shown in FIG. 1.
Figure 4B:
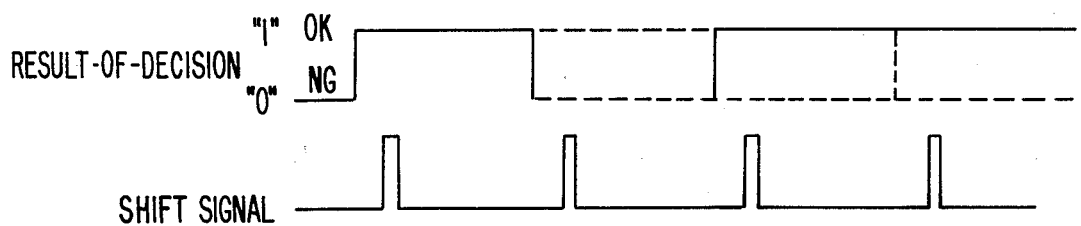
FIG. 4(B) is a signal waveform diagram for the circuit shown in FIG. 4(A) under an operating condition.

FIG. 4(A) is a schematic circuit diagram showing one example of the result-of-decision recording-renewal indicator section 8, in which reference numeral 9 designates lamps, numeral 11 designates lamp drivers and numeral 12 designates shift-registers. FIG. 4(B) is a signal waveform diagram for the circuit shown in FIG. 4(A) under an operating condition.

Figure 5:
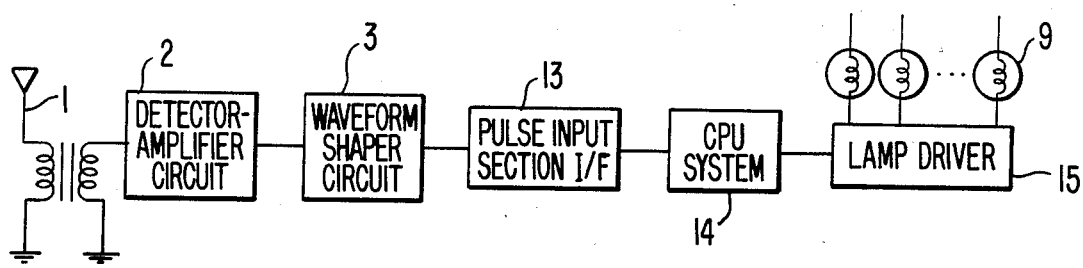
FIG. 5 is a block diagram showing a construction of another preferred embodiment of the present invention.

FIG. 5 is a block diagram showing another preferred embodiment of the present invention, in which component parts similar to those shown in FIG. 1 are given like reference numerals and further description thereof is omitted. Reference numeral 13 designates a pulse input section adapted to receive pulse signals which are output from a waveform shaper circuit 3, and signals are supplied from this pulse input section 13 to a CPU system (computer system) 14. In the case of employing this CPU system 14, since operations are effected under program control, there is no need to use the shift-registers 12 shown in FIG. 4, but an output of the CPU system is directly supplied to a lamp driver 15.

Now, description will be made on the automatic examination system for automobiles or the like according to the present invention constructed in the above-described manner, with reference to FIGS. 1 to 4. In an engine, gas discharge is induced by applying a high voltage to ignition plugs for the purpose of igniting a fuel within engine cylinders and burning the fuel during operation of the engine, and therefore, various kinds of electrical noises are radiated through the atmosphere. This electrical noise is received by the receiver section 1 such as an antenna, and the received signals are detected and amplified by the detector-amplifier circuit 2 and then shaped into a desired waveform in the waveform shaper circuit 3. The shaped waveform is applied to the period measurement section 4, in which the periods for the respective signal pulses are measured by means of a clock signal generated from the timing controller circuit 10, a counter A and a counter B. The measured respective periods for the respective signal pulses are then applied to the period difference calculator section 5, in which the respective period differences are calculated according to the method described previously with reference to FIG. 3. The respective period differences calculated in the period difference calculator section 5 are applied to the comparing decision section 6, in which the period differences are compared with a given reference value 7 and decision is made whether or not the period differences are tolerable differences, then the output signal of the comparing decision section 6 is applied to the result-of-decision recording-renewal indicator section 8 consisting of the shift-registers 12 and the lamp drivers 11 and illustrated in FIG. 4, and a good or bad condition of the engine is indicated by illuminating or not illuminating the lamps 9. In this case, as a matter of course, the operations of the above-described period measurement section 4, period difference calculator section 5, comparing decision section 6 and result-of-decision recording-renewal indicator section 8, respectively, are effected on the basis of the instructions issued from the timing controller circuit 10.

The other preferred embodiment of the present invention illustrated in FIG. 5 is an embodiment employing a CPU system, in which measurement of the periods of the respective signal pulses, calculation of the period differences and decision by comparison between the respective period differences and the given reference value are respectively carried out under predetermined program control in the CPU system, and since these operations are substantially the same as those described with reference to FIG. 1, further description thereof will be omitted.

While description has been made with respect to the case where electrical signals such as an ignition noise are used as the signals transmitted from an engine in the above-described respective preferred embodiments of the present invention, the present invention should not be limited to the use of electrical signals but the embodiments could be modified, for example, so as to use sonic signals. In the case where sonic signals are used as the signals transmitted from an engine as referred to above, it is only necessary to use a microphone for receiving sonic waves in place of the antenna in the receiver section. Moreover, if the embodiment is modified so as to use sonic signals, then, for instance, even automatic examination of diesel engines also becomes possible.

Since the present invention has the above-mentioned features, an engine of an automobile or the like can be automatically examined by non-contact and remote manipulations, also respective signals for representing start and completion of examination are not necessitated, further if this system is in a switch-on state (a power-supplied state) it is always in a ready-to-examine state (an examination monitoring state), and if the system is located within the range where signals transmitted from an engine can be received, then always automatic examination is possible. Furthermore, since the results of examination are momentarily indicated by illuminating or not illuminating lamps or the like in the indicator section, even at a remote location, decision of whether an engine is good or bad can be effected very quickly and easily.

Accordingly, it is a matter of course that the system according to the present invention can be replaced for the examination in the prior art which relies upon the auditory sense of skilled adjustment engineers, and since the system according to the present invention can achieve scientific examination, erroneous examination caused by an individual difference as will be encountered in the case of the examination relying upon the auditory sense in the prior art, would never occur at all. Furthermore, since the system according to the present invention can carry out quick and reliable examination without contacting an automobile even when the automobile passes, for example, through a toll gate, engine trouble upon running on a speedway can be preliminarily avoided, and also at a gas station or the like, services for a customer of safety assurance and energy saving (saving of a fuel cost) can be offered by carrying out quick and reliable examination without contacting an automobile.

Still further, if a number of cycles and a number of cylinders, for example, of an engine are known, a rotational speed of the engine can be measured by counting the number of pulses for a predetermined time interval according to instructions issued from the timing controller in the system according to the present invention, and hence, the system according to the present invention can be applied also to line test of a finished automobile in an automobile manufacturing factory or the like. Moreover, the system according to the present invention is also applicable to inspection of an engine at an official checkout station of automobiles, for example, or the like, to exposure and warning for unadjusted automobiles on a general road by remote manipulations and to inspection of received automobiles by an automobile dealer. Besides the above-mentioned applications, the system according to the present invention is also widely applicable, for example, to examination of diesel engines, and inspection of various multi-purpose engines other than the engines for automobiles.

In essence, according to the present invention, there is provided an automatic examination system for automobiles or the like which can automatically examine an engine quickly and reliably in a remote non-contact manner, owing to the provision of a receiver section disposed apart from an engine of an automobile or the like for receiving via a space either electric signals or sonic signals transmitted from the engine, a period measurement section for measuring the respective periods between the respective signals received by the receiver section, a period difference calculator section for calculating the respective period differences between the respective periods measured by the respective period measurement section, and a good/bad decision section for deciding whether the engine is good or bad by comparing the respective period differences calculated by the period difference calculator section with a given reference value, and therefore, the present invention is industrially very useful.

Since many changes and modifications could be made in the above construction and many apparently widely different embodiments of the invention could be made without departing from the scope thereof, it is intended that all matter contained in the above description or shown in the accompanying drawings shall be interpreted as illustrative and not as a limitation to the scope of the invention.

What is claimed is:

1. An automatic examination system for motor vehicles comprising: a receiver section fixedly mounted on a floor of an examination station and disposed apart from an engine of a motor vehicle for receiving via space either electrical signals or sonic signals transmitted from said engine; a period measurement section for measuring the respective periods between said respective signals received by said receiver section; a period difference calculator section for calculating the respective period differences between said respective periods measured by said period measurement section; and a good/bad decision section for deciding whether said engine is good or bad by comparing said respective period differences calculated by the period difference calculator section with a given reference value.

2. An automatic examination system for motor vehicles as claimed in claim 1, further comprising a timing controller circuit for controlling timing of the operations in said period measurement section and period difference calculation section and said good/bad decision section.

3. An automatic examination system for motor vehicles as claimed in claim 1, further comprising an indicator section for indicating the results of decision as to whether said engine is good or bad, said decision being executed by said good/bad decision section.

* * * * *